Nov. 15, 1932.    L. POLL    1,888,143
PLANTING MACHINE
Filed Nov. 19, 1927    3 Sheets-Sheet 1
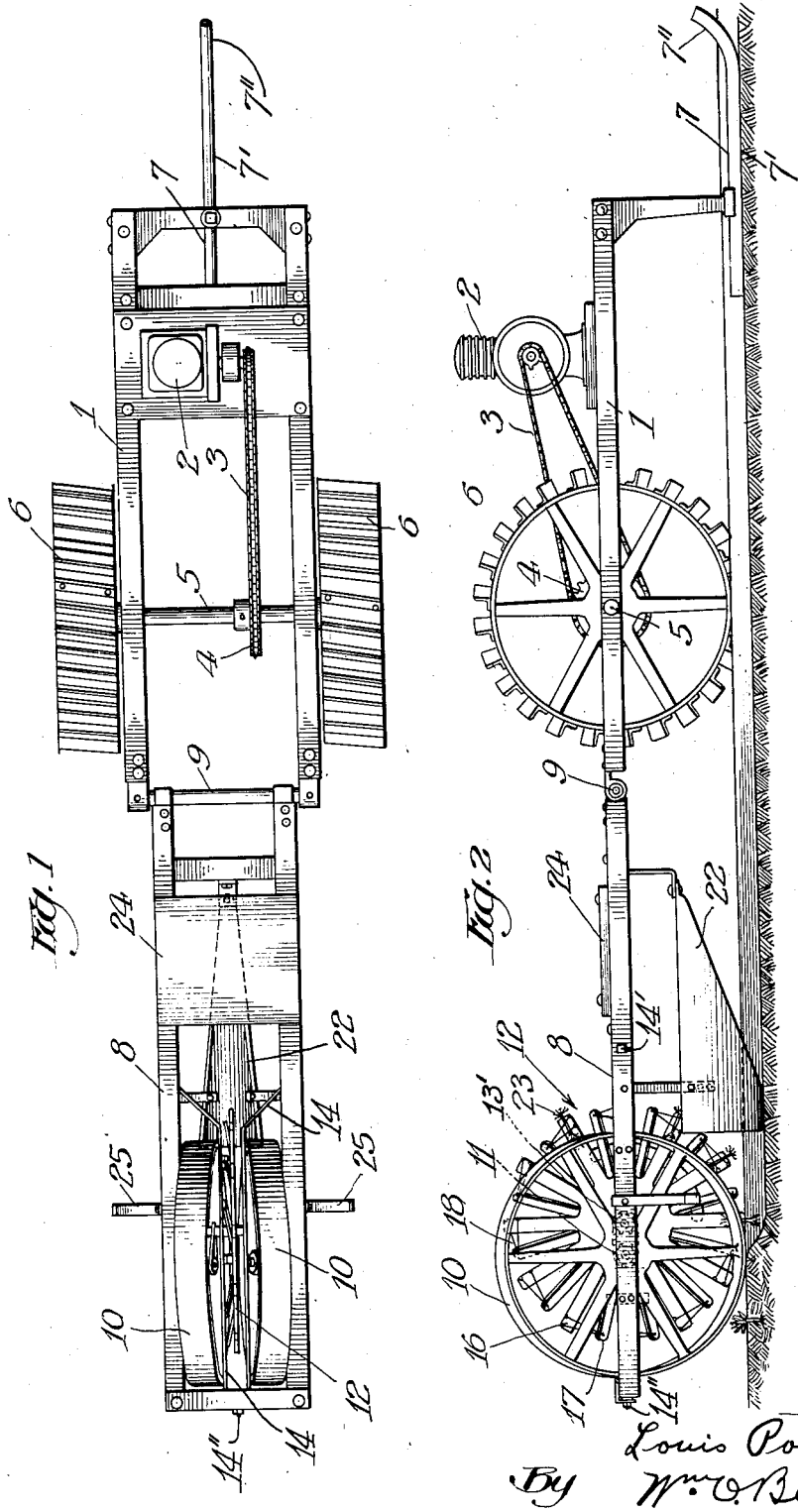

Nov. 15, 1932.  L. POLL  1,888,143
PLANTING MACHINE
Filed Nov. 19, 1927  3 Sheets-Sheet 2
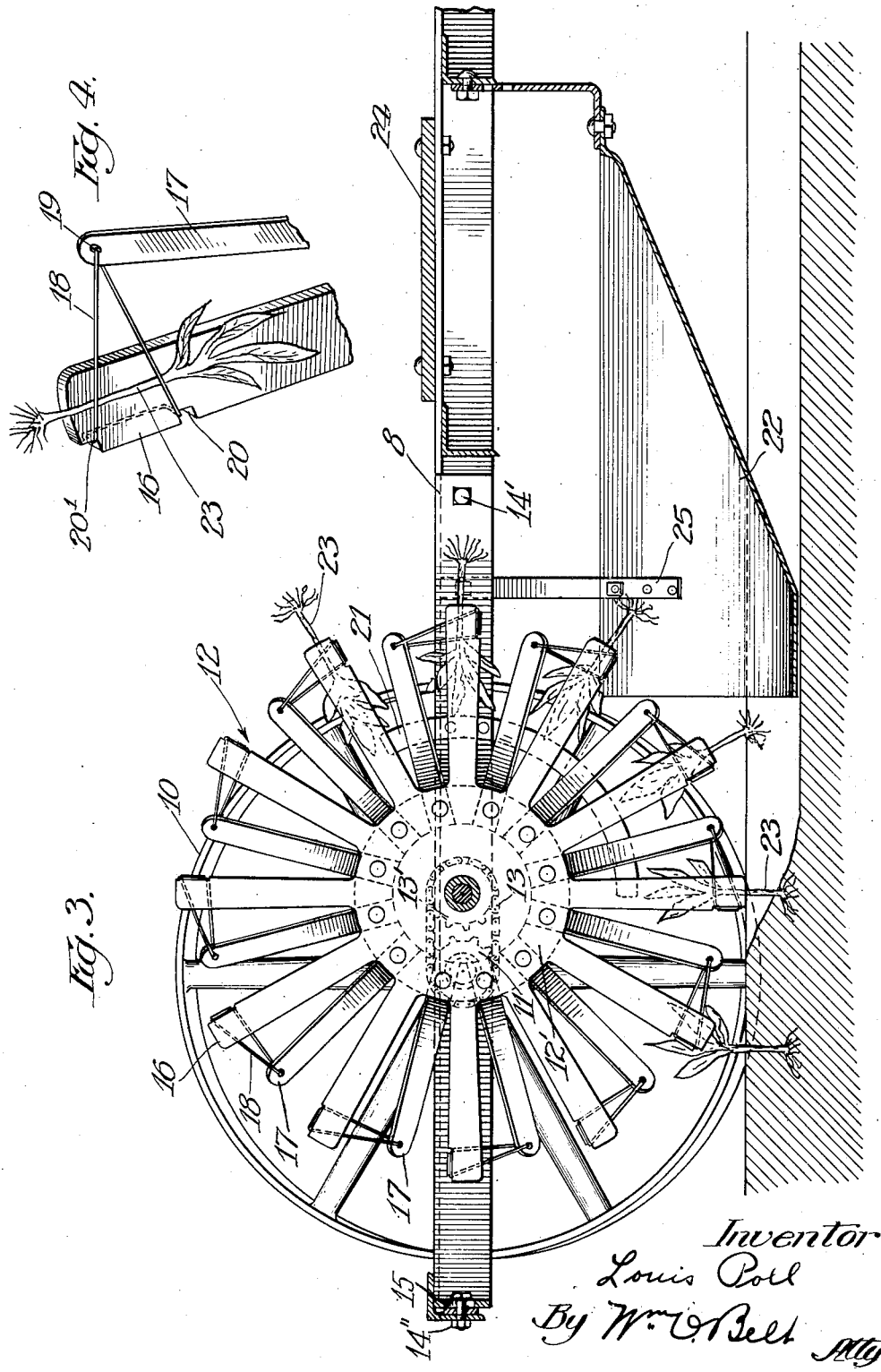

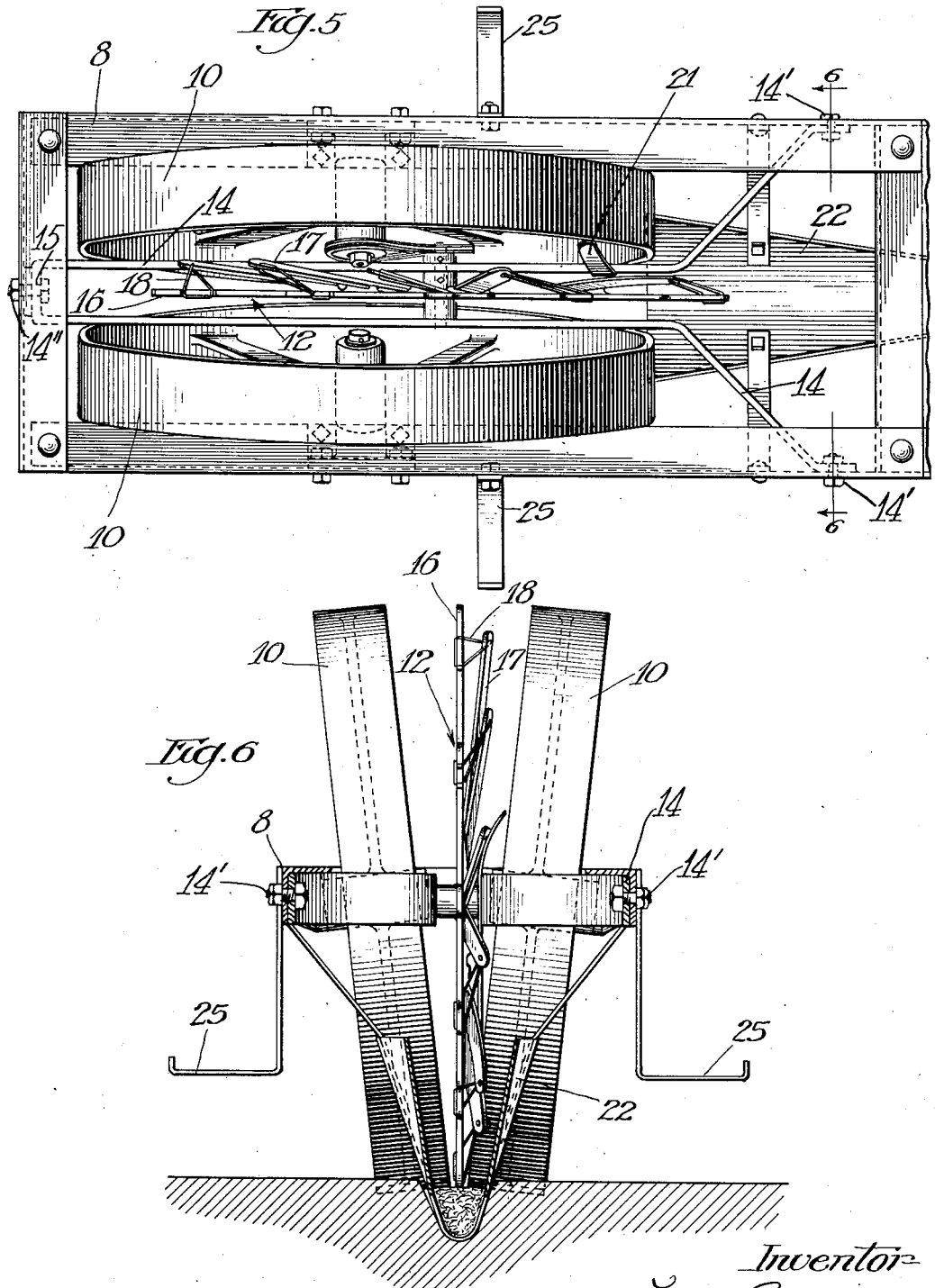

Patented Nov. 15, 1932

1,888,143

UNITED STATES PATENT OFFICE

LOUIS POLL, OF HAMILTON, MICHIGAN

PLANTING MACHINE

Application filed November 19, 1927. Serial No. 234,302.

This invention relates to planting machines and has for its primary object the provision of improved and novel means for setting plants in the ground and then packing the earth about the plants.

Another object of the invention is to provide a machine for setting plants which will not injure the plants during the setting operation.

Another object is to provide resilient means adapted to receive and hold the plants in planting position and then to release the plants at predetermined intervals.

Another object is to provide a novel machine of simple construction for carrying the plants to planting position and then depositing them in regular succession in a previously made furrow, and packing the earth about the plant without mutilating or otherwise damaging the plant.

In the accompanying drawings illustrating a selected embodiment of the invention the views are as follows:

Fig. 1 is a top plan view of the machine.
Fig. 2 is a side elevation thereof.
Fig. 3 is a detail sectional view.
Fig. 4 is a detail view of the plant holding means.
Fig. 5 is a detail plan view showing the packing wheels and the planting disk.
Fig. 6 is a sectional view taken on the line 6—6 of Fig. 5.

Referring to the drawings, 1 designates a suitable main frame upon which is mounted the engine 2 which drives the sprocket chain 3 running on the sprocket 4 fixed to the axle 5, mounted on the frame.

Driving wheels 6, 6 are fixed to the axle and propel the machine across the field. A guide 7 pivoted to the front part of the main frame comprises a runner 7' having its forward end turned up as at 7'' and travels in a previously made furrow to steer the machine across the field.

A sub frame 8 is connected to the cross bar 9 of the main frame and has mounted thereon a pair of packing wheels 10, 10 which incline at an angle from a plane perpendicular to their axial center line and pack the earth about the plants after they are set. One of the packing wheels has a sprocket 11 mounted thereon which drives a planting disk 12 by means of the chain 13 and the sprocket 13' fixed to the disk. The disk 12 is revolubly mounted on a substantially U-shaped brace 14 fastened to the sub frame by means of the side bolts 14' and the rear bolt 14''. The brace 14 is free to fulcrum on the side bolts 14' and is provided with an elongated slot 15 at its rear end to permit vertical movement thereof on the bolt 14'' and provides for vertical adjustment of the disk 12 to vary the planting depth of the disk. The chain sprocket connection on one of the packing wheels and the disk allows for this adjustment.

The disk 12 comprises a central or hub portion 12' to which the radial arms 16 are rigidly connected. A plurality of resilient members 17 extend radially from the central portion 12' and are disposed at an angle to a plane perpendicular to the axial center line of the disk, as clearly shown in Figs. 3 and 4.

A flexible tie member 18, Fig. 4, passes through a hole 19 in the resilient member and engages the notches 20 and 20' in the arms 16. A cam 21 fixed to the sub frame 8 engages the resilient members 17 successively during rotation of the disk 12, causing these members to be sprung inwardly and allowing the flexible tie members 18 to bear against the radial arms. A shoe 22 arranged forwardly of the disk 12 is attached to the sub frame to guide the device, and this shoe also loosens up the earth into which the plants 23 are set.

A seat 24 and a pair of foot rests 25 are arranged on the sub frame for the operator.

The operation of the device is as follows: The motor is started, the machine is put in motion and is guided across the field by setting the guide 7 and the shoe 22 in a previously made furrow. The operator sits on the seat 24 and inserts a plant between a flexible tie member and one of the radial arms before the resilient member contacts with the cam 21. As the disk 12 revolves each resilient member will be pressed inwardly as it strikes the cam and cause the plant to be clamped between the flexible tie member and the radial arm. After the resilient member leaves the cam, Fig. 3, the plant is released in its normal or vertical position and the packing wheels pack the earth about the plants. A plant is set on each arm as the disk revolves and the operation previously described is repeated with each plant.

The machine is very simple in construction and positive in operation. The plant is protected against damage during the operation of the machine because it is held against a flat arm 16 by a flexible tie member 18 which is tensioned by the resilient member 17.

Changes may be made in the form, construction and arrangement of the parts without departing from the spirit of the invention or sacrificing any of its advantages and the right is hereby reserved to make all such changes as fairly fall within the scope of the following claims.

I claim:

1. In a planting machine, a frame a revoluble disk having radial arms and rotatably mounted on said frame, resilient means arranged between said arms, flexible members connected to said arms and said resilient means arranged in the path of the resilient means for moving the flexible members in cooperation with the arms for holding plants.

2. In a planting machine, a frame, a revoluble disk mounted for adjustment with respect to the ground, arms radiating from said disk, resilient means secured to said disk and extending therefrom in a manner to be disposed between the arms, flexible means having connection with said arms and resilient means respectively, a cam carried by said frame and arranged in the path of said resilient means to move the latter in a direction to cause the flexible means to bind against said arms to provide plant holding means.

3. In a planting machine, a wheeled frame, an adjustably mounted disk provided with radial arms and being rotatably mounted on said frame, resilient members arranged between said arms and inclined outwardly therefrom, flexible means connected to said arms and said members near their outer ends and adapted to receive a plant therebetween, and a cam on said frame for moving the resilient members toward said arms at predetermined intervals.

4. In a planting machine, a plant holding means comprising a disk, a hub for said disk, arms radiating from the periphery of said disk, resilient members extending radially from the hub and secured to said disk in a manner to extend from between the arms, said resilient members being inclined and disposed at an angle with respect to the side edges of the arms, said arms being notched with the notches arranged in pairs adjacent the outer ends thereof, a flexible element for each resilient member and arm, said flexible element passing through an opening formed adjacent the end of the resilient member, and being detachably received by the notches, and means arranged in the path of and engageable with said resilient members for disposing the flexible elements in cooperation with the arms to detachably secure plants between the arms and flexible elements.

5. A transplanter comprising a carrier, grippers of flexible material secured at one end to the carrier, spring arms with which the other ends of said grippers are connected secured to said carrier so that the gripper members are held under yielding longitudinal tension and normally away from the carrier to receive a plant, and means for closing said holders and holding them in closed position while moving from receiving to discharging position.

6. A planting machine comprising a revoluble member having a plant receiving seat, a laterally movable arm disposed substantially opposite said seat and bodily movable in timed relation with the revoluble member, said arm being normally retracted laterally from the revoluble member, a flexible member terminally secured to said revoluble member and said arm in spanning relation to said seat, and means for deflecting the arm towards the revoluble member to engage the flexible member with a plant disposed on said seat.

7. A planting machine comprising a revoluble member having a plant receiving seat, a laterally movable arm disposed substantially opposite said seat and bodily movable in timed relation with the revoluble member, said arm being normally retracted from the revoluble member, a flexible member terminally secured to said revoluble member and said arm in spanning relation to said seat, and means for deflecting the arm towards the revoluble member during a part of each revolution of the latter to engage the flexible member with a plant disposed on said seat during such period of rotation of the revoluble member.

8. A planting machine comprising a revoluble member having a plant receiving seat, a yieldingly retracted arm carried by the revoluble member and disposed substantially opposite said seat, a flexible member terminally secured to said revoluble member and said arm in spanning relation to said seat, and means for deflecting the arm towards the revoluble member to engage the flexible member with a plant disposed on said seat.

9. A planting machine comprising a revoluble member having a plant receiving seat, a yieldingly retracted arm carried by said member substantially opposite said seat, a flexible member terminally secured to said revoluble member and said arm in spanning relation to said seat, and means for deflecting the arm towards the revoluble member during a part of each revolution of the latter to engage the flexible member with a plant disposed on said seat during such period of rotation of the revoluble member.

10. A planting machine comprising a revoluble member having a plant receiving seat, a yieldingly retracted arm mounted on the revoluble member substantially opposite said seat, a flexible member terminally secured to said revoluble member and said arm in spanning relation to said seat and a fixed member disposed in the path of the arm to deflect the latter toward the revoluble member and engage the flexible member with a plant disposed on said seat.

11. A planting machine comprising a revoluble member having a plant receiving seat, a yieldingly retracted arm mounted on the revoluble member substantially opposite said seat, a flexible member terminally secured to said revoluble member and said arm in spanning relation to said seat, and a fixed arcuate member disposed in the path of the arm for deflecting it toward the revoluble member to engage the flexible member with a plant disposed on said seat during a specified angular movement of the revoluble member.

12. A planting machine comprising a revoluble member having a plant receiving seat, a flexible member arranged in spanning relation to said seat and secured to the revoluble member at one side of said seat, movable means disposed on the opposite side of said seat and having the flexible member secured thereto, and means for swinging the last said means to bring the flexible member into binding engagement with a plant disposed on said seat.

13. A planting machine comprising a revoluble member having a plant receiving seat, a flexible member arranged in spanning relation to said seat and secured to the revoluble member at one side of said seat, means movable toward and away from the revoluble member and having the flexible member secured thereto, and means disposed in the path of the last said means and engageable with the latter to move the same toward the revoluble member to engage the flexible member with a plant disposed on said seat.

14. In a planting machine, a frame, a revoluble member mounted on said frame, means carried by and normally spaced from said revoluble member, a flexible member connected to said revoluble member and said means, and means disposed in the path of said first named means for moving it toward the revoluble member to engage the flexible member with a plant disposed between said flexible member and said revoluble member.

LOUIS POLL.